United States Patent
Tejani et al.

(10) Patent No.: US 7,889,716 B2
(45) Date of Patent: Feb. 15, 2011

(54) METHODS, SYSTEMS, AND COMPUTER PROGRAM PRODUCTS FOR USING AN E.164 NUMBER (ENUM) DATABASE FOR MESSAGE SERVICE MESSAGE ROUTING RESOLUTION AMONG 2G AND SUBSEQUENT GENERATION NETWORK SYSTEMS

(75) Inventors: Aziz A. Tejani, Morrisville, NC (US); Apirux Bantukul, Cary, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 1095 days.

(21) Appl. No.: 11/291,502

(22) Filed: Dec. 1, 2005

(65) Prior Publication Data
US 2007/0133574 A1 Jun. 14, 2007

(51) Int. Cl.
*H04L 12/66* (2006.01)
*H04L 12/26* (2006.01)

(52) U.S. Cl. ...................................... 370/352; 370/401

(58) Field of Classification Search ................ 370/328, 370/335, 342, 395, 401, 402, 524, 238, 392
See application file for complete search history.

(56) References Cited

U.S. PATENT DOCUMENTS

| | | | |
|---|---|---|---|
| 4,310,727 A | 1/1982 | Lawser |
| 4,754,479 A | 6/1988 | Bicknell et al. |
| 5,089,954 A | 2/1992 | Rago |
| 5,237,604 A | 8/1993 | Ryan |
| 5,247,571 A | 9/1993 | Kay et al. |
| 5,251,248 A | 10/1993 | Tokunaga et al. |
| 5,400,390 A | 3/1995 | Salin |
| 5,420,916 A | 5/1995 | Sekiguchi |
| 5,422,941 A | 6/1995 | Hasenauer et al. |
| 5,423,068 A | 6/1995 | Hecker |
| 5,430,719 A | 7/1995 | Weisser, Jr. |
| 5,442,683 A | 8/1995 | Hoogeveen |

(Continued)

FOREIGN PATENT DOCUMENTS

EP 0 512 962 A2 11/1992

(Continued)

OTHER PUBLICATIONS

Notification Concerning Transmittal of International Preliminary Report on Patentibility for International Application No. PCT/US2006/046108 (Oct. 2, 2008).

(Continued)

*Primary Examiner*—Curtis Kuntz
*Assistant Examiner*—Mohammad Islam
(74) *Attorney, Agent, or Firm*—Jenkins, Wilson, Taylor & Hunt, P.A.

(57) ABSTRACT

Methods, systems, and computer program products for using an E.164 number (ENUM) database for message service message routing resolution among 2G and subsequent generation network systems are disclosed. According to one method, a message including message service message content is received. The message may include a 2G message recipient identifier. An ENUM database may be queried. A response from the ENUM database is received. Based on the response, unavailability of a subsequent generation network address for the recipient is determined. In response to the unavailability, the message service message content is attempted to be delivered to the recipient via a 2G network.

29 Claims, 7 Drawing Sheets

U.S. PATENT DOCUMENTS

| | | | |
|---|---|---|---|
| 5,455,855 A | 10/1995 | Hokari |
| 5,457,736 A | 10/1995 | Cain et al. |
| 5,475,732 A | 12/1995 | Pester, III |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Åström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,812,639 A | 9/1998 | Bartholomew et al. |
| 5,819,178 A | 10/1998 | Cropper |
| 5,822,694 A | 10/1998 | Coombes et al. |
| 5,832,382 A | 11/1998 | Alperovich |
| 5,841,854 A | 11/1998 | Schumacher et al. |
| 5,852,660 A | 12/1998 | Lindquist et al. |
| 5,854,982 A | 12/1998 | Chambers et al. |
| 5,862,481 A | 1/1999 | Kulkarni et al. |
| 5,867,788 A | 2/1999 | Joensuu |
| 5,878,347 A | 3/1999 | Joensuu et al. |
| 5,878,348 A | 3/1999 | Foti |
| 5,889,849 A | 3/1999 | Ban et al. |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichani et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,094,578 A | 7/2000 | Purcell et al. |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,134,441 A | 10/2000 | Åström et al. |
| 6,137,806 A | 10/2000 | Martinez |
| 6,138,007 A | 10/2000 | Bharatia |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,175,743 B1 | 1/2001 | Alperovich et al. |
| 6,178,181 B1 | 1/2001 | Glitho |
| 6,192,242 B1 | 2/2001 | Rollender |
| 6,205,210 B1 | 3/2001 | Rainey et al. |
| 6,208,870 B1 | 3/2001 | Lorello et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,292,669 B1 | 9/2001 | Meuronen et al. |
| 6,298,232 B1 | 10/2001 | Marin et al. |
| 6,308,075 B1 | 10/2001 | Irten et al. |
| 6,324,279 B1 | 11/2001 | Kalmanek et al. |
| 6,327,350 B1 | 12/2001 | Spangler et al. |
| 6,338,140 B1 | 1/2002 | Owens et al. |
| 6,356,529 B1 | 3/2002 | Zarom |
| 6,363,431 B1 | 3/2002 | Hammer et al. |
| 6,377,674 B1 | 4/2002 | Chong et al. |
| 6,377,807 B1 | 4/2002 | Iparrea et al. |
| 6,411,632 B2 | 6/2002 | Lindgren et al. |
| 6,424,832 B1 | 7/2002 | Britt et al. |
| 6,434,127 B1 | 8/2002 | Ha |
| 6,453,174 B1 | 9/2002 | Cunningham et al. |
| 6,463,055 B1 | 10/2002 | Lupien et al. |
| 6,493,551 B1 | 12/2002 | Wang et al. |
| 6,505,046 B1 | 1/2003 | Baker |
| 6,512,926 B1 | 1/2003 | Henry-Labordere |
| 6,515,997 B1 | 2/2003 | Feltner et al. |
| 6,519,242 B1 | 2/2003 | Emery et al. |
| 6,519,468 B1 | 2/2003 | Donovan et al. |
| 6,529,524 B1 | 3/2003 | Liao et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,594,258 B1 | 7/2003 | Larson et al. |
| 6,611,516 B1 | 8/2003 | Pirkola et al. |
| 6,615,037 B1 | 9/2003 | Bharatia et al. |
| 6,625,461 B1 | 9/2003 | Bertacchi |
| 6,643,511 B1 | 11/2003 | Rune et al. |
| 6,662,017 B2 | 12/2003 | McCann et al. |
| 6,683,881 B1 | 1/2004 | Mijares et al. |
| 6,684,073 B1 | 1/2004 | Joss et al. |
| 6,697,620 B1 | 2/2004 | Lamb et al. |
| 6,731,926 B1 | 5/2004 | Link, II et al. |
| 6,738,636 B2 | 5/2004 | Lielbriedis |
| 6,745,041 B2 | 6/2004 | Allison et al. |
| 6,748,057 B2 | 6/2004 | Ranalli et al. |
| 6,795,701 B1 | 9/2004 | Baker et al. |
| 6,801,781 B1 | 10/2004 | Provost et al. |
| 6,819,932 B2 | 11/2004 | Allison et al. |
| 6,826,397 B1 | 11/2004 | Vasa |
| 6,836,477 B1 | 12/2004 | West, Jr. et al. |
| 6,850,768 B2 | 2/2005 | Foll |
| 6,865,191 B1 | 3/2005 | Bengtsson et al. |
| 6,873,849 B2 * | 3/2005 | de la Red et al. ........... 455/445 |
| 6,885,872 B2 | 4/2005 | McCann et al. |
| 6,912,389 B2 | 6/2005 | Bright et al. |
| 6,917,612 B2 | 7/2005 | Foti et al. |
| 6,950,441 B1 | 9/2005 | Kaczmarczyk et al. |
| 6,993,038 B2 | 1/2006 | McCann |
| 7,035,239 B2 | 4/2006 | McCann et al. |
| 7,039,037 B2 * | 5/2006 | Wang et al. ................. 370/349 |
| 7,043,002 B2 | 5/2006 | Delaney et al. |
| 7,079,524 B2 | 7/2006 | Bantukul et al. |
| 7,079,853 B2 | 7/2006 | Rathnasabapathy et al. |
| 7,085,260 B2 | 8/2006 | Karaul et al. |
| 7,092,505 B2 | 8/2006 | Allison et al. |
| 7,113,800 B2 | 9/2006 | Linkola |
| 7,145,875 B2 | 12/2006 | Allison et al. |
| 7,181,194 B2 | 2/2007 | McCann et al. |
| 7,190,959 B2 | 3/2007 | Palmer et al. |
| 7,221,952 B2 | 5/2007 | Cho et al. |
| 7,257,401 B1 | 8/2007 | Dizdarevic et al. |
| 7,274,683 B2 | 9/2007 | Segal |
| 7,286,839 B2 | 10/2007 | McCann et al. |
| 7,366,530 B2 | 4/2008 | McCann et al. |
| 7,397,773 B2 * | 7/2008 | Qu et al. .................... 370/320 |
| 7,551,608 B1 * | 6/2009 | Roy .......................... 370/352 |
| 7,746,864 B1 | 6/2010 | Asawa et al. |
| 2001/0006897 A1 | 7/2001 | Kang et al. |
| 2001/0029182 A1 | 10/2001 | McCann et al. |
| 2001/0030957 A1 | 10/2001 | McCann et al. |
| 2001/0040957 A1 | 11/2001 | McCann et al. |
| 2001/0046856 A1 | 11/2001 | McCann |
| 2002/0132636 A1 | 9/2002 | Stockhusen |
| 2002/0147845 A1 | 10/2002 | Sanchez-Herrero et al. |
| 2002/0173320 A1 | 11/2002 | Aitken et al. |
| 2002/0176382 A1 * | 11/2002 | Madour et al. ............. 370/331 |
| 2003/0003930 A1 | 1/2003 | Allison et al. |
| 2003/0007482 A1 * | 1/2003 | Khello et al. ............... 370/352 |
| 2003/0016684 A1 | 1/2003 | Prasad et al. |
| 2003/0026289 A1 | 2/2003 | Mukherjee et al. |
| 2003/0032432 A1 * | 2/2003 | Red et al. .................... 455/445 |

| | | | |
|---|---|---|---|
| 2003/0054844 A1 | 3/2003 | Anvekar et al. | |
| 2003/0061234 A1 | 3/2003 | Ali et al. | |
| 2003/0065788 A1* | 4/2003 | Salomaki | 709/227 |
| 2003/0081754 A1 | 5/2003 | Esparza et al. | |
| 2003/0109271 A1 | 6/2003 | Lewis et al. | |
| 2003/0128693 A1 | 7/2003 | Segal | |
| 2003/0157938 A1 | 8/2003 | Haase et al. | |
| 2003/0193967 A1 | 10/2003 | Fenton et al. | |
| 2003/0227899 A1 | 12/2003 | McCann | |
| 2004/0076126 A1* | 4/2004 | Qu et al. | 370/320 |
| 2004/0081206 A1 | 4/2004 | Allison et al. | |
| 2004/0082332 A1 | 4/2004 | McCann et al. | |
| 2004/0087300 A1 | 5/2004 | Lewis | |
| 2004/0125925 A1 | 7/2004 | Marsot | |
| 2004/0142707 A1 | 7/2004 | Midkiff et al. | |
| 2004/0198351 A1 | 10/2004 | Knotts | |
| 2004/0202187 A1 | 10/2004 | Kelly et al. | |
| 2004/0219935 A1 | 11/2004 | McCann et al. | |
| 2004/0246965 A1 | 12/2004 | Westman et al. | |
| 2004/0264674 A1 | 12/2004 | Delaney et al. | |
| 2005/0003838 A1* | 1/2005 | McCann et al. | 455/466 |
| 2005/0119017 A1 | 6/2005 | Lovell, Jr. et al. | |
| 2005/0238048 A1 | 10/2005 | Delaney et al. | |
| 2005/0286531 A1 | 12/2005 | Tuohino et al. | |
| 2006/0034256 A1* | 2/2006 | Addagatla et al. | 370/352 |
| 2006/0067338 A1 | 3/2006 | Hua et al. | |
| 2006/0098621 A1* | 5/2006 | Plata Andres et al. | 370/352 |
| 2006/0136557 A1 | 6/2006 | Schaedler et al. | |
| 2006/0281492 A1 | 12/2006 | Jiang | |
| 2007/0061397 A1 | 3/2007 | Gregorat et al. | |
| 2007/0066326 A1 | 3/2007 | Agarwal et al. | |
| 2007/0104184 A1 | 5/2007 | Ku et al. | |
| 2007/0121879 A1 | 5/2007 | McGary et al. | |
| 2007/0203909 A1 | 8/2007 | Marathe | |
| 2007/0207802 A1 | 9/2007 | Palmer et al. | |
| 2007/0286379 A1 | 12/2007 | Wiatrowski et al. | |
| 2008/0019356 A1 | 1/2008 | Marsico | |
| 2008/0130856 A1 | 6/2008 | Ku et al. | |
| 2008/0248820 A1 | 10/2008 | Lohtia | |
| 2008/0311917 A1 | 12/2008 | Marathe et al. | |
| 2009/0043704 A1 | 2/2009 | Bantukul et al. | |
| 2009/0103707 A1 | 4/2009 | McGary et al. | |
| 2009/0227276 A1 | 9/2009 | Agarwal et al. | |

FOREIGN PATENT DOCUMENTS

| | | |
|---|---|---|
| EP | 0 788 283 A2 | 8/1997 |
| EP | 0 936 825 A3 | 8/1999 |
| EP | 0 944 276 A1 | 9/1999 |
| EP | 1 558 004 A | 7/2005 |
| EP | 1 742 452 A1 | 1/2007 |
| EP | 1 950 942 A1 | 7/2008 |
| KR | 10-2004-0107271 A | 12/2004 |
| WO | WO 95/12292 A1 | 5/1995 |
| WO | WO 96/11557 | 4/1996 |
| WO | WO 97/33441 A1 | 9/1997 |
| WO | WO 98/18269 | 4/1998 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 00/60821 | 10/2000 |
| WO | WO 01/47297 A2 | 6/2001 |
| WO | WO 01/48981 A1 | 7/2001 |
| WO | WO 01/54444 A1 | 7/2001 |
| WO | WO 02/060192 A2 | 8/2002 |
| WO | WO 03/005664 A2 | 1/2003 |
| WO | WO 03/021982 A1 | 3/2003 |
| WO | WO 03/105382 A | 12/2003 |
| WO | WO 2004/006534 | 1/2004 |
| WO | WO 2004/0087686 A | 1/2004 |
| WO | WO 2004/075507 | 9/2004 |
| WO | WO 2004/102345 A2 | 11/2004 |
| WO | WO 2005/002311 A2 | 1/2005 |
| WO | WO 2005/013538 A3 | 2/2005 |
| WO | WO 2006/072473 A1 | 7/2006 |
| WO | WO 2007/045991 A1 | 4/2007 |
| WO | WO 2007/092205 A2 | 8/2007 |
| WO | WO 2007/095379 A2 | 8/2007 |
| WO | WO 2007/146257 A2 | 12/2007 |
| WO | WO 2008/011101 A2 | 1/2008 |
| WO | WO 2008/157213 A2 | 12/2008 |
| WO | WO 2009/023573 A2 | 2/2009 |

OTHER PUBLICATIONS

Notification of Transmittal of the International Search Report and the Written Opinion of the International Searching Authority, or the Declaration for Ineternational Application No. PCT/US2006/046108 (Sep. 9, 2008).

Communication of European publication number and information on the application of Article 67(3) EPC for Application No. 06844747.3 (Jul. 23, 2008).

Supplementary European Search Report for European Application No. 06844747.3 (Apr. 24, 2009).

Commonly assigned, co-pending U.S. Appl. No. 12/400,576 for, "Methods, Systems, and Computer Readable media for Routing a Message Service Message Trhough a Communications Network," filed Mar. 9, 2009.

Notification of Transmittal of the International Search Report and the Written Opinion of the International Searching Authority, or the Declaration for International Application No. PCT/US2008/072641 (Feb. 24, 2009).

Notification of Transmittal of the International Search Report and the Written Opinion of the International Searching Authority, or the Declaration for International Application No. PCT/US2008/066675 (Dec. 9, 2008).

Supplemental Notice of Allowance and Fee(s) Due for U.S. Appl. No. 11/112,126 (Mar. 28, 2008).

Notice of Allowance and Fee(s) Due for U.S. Appl. No. 11/112,126 (Dec. 17, 2007).

Notice of Allowance for U.S. Appl. No. 10/729,519 (Jul. 30, 2007).

Official Action for U.S. Appl. No. 11/112,126 (Jun. 15, 2007).

"IP Multimedia Subsystem," printout from wikipedia.org, Wikimedia Foundation, Inc. (May 29, 2007).

Official Action for U.S. Appl. No. for 10/729,519 (Nov. 28, 2006).

Notification Concerning Transmittal of International Preliminary Report on Patentability for International Application No. PCT/US2004/024328 (Jul. 20, 2006).

"HP OperCall Home Subscriber Server Software—Data Sheet", 4AA0-3360ENW Rev. 2, Hewlett-Packard Development Company, L.P. (Jul. 2006).

Notice of Allowance for U.S. Appl. No. 10/631,586 (May 25, 2006).

Notification of Transmittal of the International Search Report, or the Declaration and Written Opinion of the International Searching Authority for International Application No. PCT/US2004/024328 (Apr. 25, 2006).

Supplemental Notice of Allowance for U.S. Appl. No. 09/747,070 (Feb. 10, 2006).

Communication pursuant to Rules 109 and 110 EPC for European Application No. 04751843.6 (Dec. 16, 2005).

Notice of Allowance for U.S. Appl. No. 09/747,070 (Dec. 2, 2005).

Interview Summary for U.S. Appl. No. 09/747,070 (Dec. 2, 2005).

Notification Concerning Transmittal of International Preliminary Report on Patentability (Chapter I of the Patent Cooperation Treaty) in International Application No. PCT/US2004/014645 (Nov. 24, 2005).

Advisory Action for U.S. Appl. No. 09/747,070 (Nov. 1, 2005).

Official Action for U.S. Appl. No. 10/631,586 (Oct. 26, 2005).

Notice of Allowance for U.S. Appl. No. 10/166,968 (Sep. 20, 2005).

Supplemental Notice of Allowance and Fee(s) Due for U.S. Appl. No. 10/842,394 (Feb. 9, 2005).

Notification of Transmittal of the International Search Report and the Written Opinion of the International Searching Authority, or the Declaration for International Application No. PCT/US2004/014645 (Dec. 16, 2004).

Notice of Allowance and Fee(s) Due for U.S. Appl. No. 10/842,394 (Dec. 15, 2004).
Notification of Transmittal of the International Search Report and the Written Opinion of the International Searching Authority, or the Declaration for International Application No. PCT/US04/06247 (Nov. 10, 2004).
Notice of Allowance for U.S. Appl. No. 09/471,946 (Oct. 15, 2004).
Final Official Action for U.S. Appl. No. 09/747,070 (May 11, 2005).
Official Action for U.S. Appl. No. 09/747,070 (Jun. 30, 2004).
Supplemental Notice of Allowability for U.S. Appl. No. 09/471,946 (May 24, 2004).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Notice of Allowance and Fee(s) Due for U.S. Appl. No. 09/471,946 (Feb. 6, 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Official Action from European Patent Office in courterpart European Patent Application (Dec. 11, 2003).
Interview Summary for U.S. Appl. No. 09/471,946 (Dec. 9, 2003).
Communication pursuant to Article 96(2) EPC for European Application No. 00988270.5 (Nov. 12, 2003).
Notification of Transmittal of the International Search Report or the Declaration for International Application No. PCT/US2003/018266 (Oct. 31, 2003).
Office Communication for U.S. Appl. No. 09/759,743 (Oct. 20, 2003).
Official Action for U.S. Appl. No. 09/471,946 (Jul. 9, 2003).
Moodie, "Agilent acceSS7: White Paper," Agilent Technologies, pp. 1-14 (Apr. 1, 2003).
Notice of Allowance and Fee(s) Due for U.S. Appl. No. 09/759,743 (Mar. 10, 2003).
Interview Summary for U.S. Appl. No. 09/759,743 (Feb. 27, 2003).
"Cisco IP Transfer Point," Cisco Systems, Inc., pp. 1-10 (Copyright 1992-2003).
"Cisco IP Transfer Point Multilayer Short Message Serivce Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).
Final Official Action for U.S. Appl. No. 09/759,743 (Dec. 2, 2002).
Barry, "A Signal for Savings," Packet, Cisco Systems Users Magazine, vol. 14, No. 4, pp. Cover; 19-21; and 81 (Fourth Quarter 2002).
Interview Summary for U.S. Appl. No. 09/759,743 (Sep. 13, 2002).
Official Action for U.S. Appl. No. 09/759,743 (May 23, 2002).
Interview Summary for U.S. Appl. No. 09/759,743 (Mar. 6, 2002).
"Agilent Technologies and Cisco Systems SS7 Over IP White Paper," Cisco Systems, Inc. and Agilent and Technologies, pp. 1-6 (Copyright 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).

Notification of Transmittal of International Preliminary Examination Report for International Application No. PCT/US1999/030861 (Dec. 28, 2001).
Official Action for U.S. Appl. No. 09/759,743 (Dec. 3, 2001).
International Preliminary Examination Report for International Application No. PCT/US01/01052 (Nov. 7, 2001).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001—Printed in the UK Nov. 30, 2001).
International Search Report for International Application No. PCT/US00/34924 (May 16, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Rockhold, "Or," Wireless Review, p. 22, 23, 26, 28, 30, 32, (Aug. 15, 2000).
Notification of Transmittal of the International Search Report or the Declaration for International Application No. PCT/US1999/030861 (Mar. 17, 2000).
"Topsail Beach-SS7 Over IP-" Cisco Systems, Inc., pp. 1-16 (Copyright 1999).
ETSI, "Digital Cellular Telecommunications Systems (Phase 2++); Support of Mobile Number Portability (MNP); Technical Realisation; Stage 2," Global System for Mobile Communications, p. 1-71, (1998).
Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requrements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7-Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," AT&T Network Systems, No. 1, p. 1-75, (Feb. 2, 1996).
ETSI, Digital Cellular Telecommunications System (Phase 2+); Milbe Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesysteme-Eine neue Generation für ISDN und intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network interface Specification (CCSNIS) Supporting SCCP and TCAP," Bell Communications Research, p. ii-xii, 1-1-C-22, (Mar. 1994).
Buckles, "Very High Capacity Signaling Trnsfer Point for Intelligent Network Servcies," DSC Communciations Corporation, p. 1308-1311, (1988).
"Diameter Overview," referenced from www.ulticom.com/html/products/signalware-diameter-reference-guide.asp (Publication date unknown).

"Chapter 1: Overview," SS7 Port Adapter Installation and Configuration, pp. 1-1-1-8 (Publication Date Unknown).
"Configuring ITP Basic Functionally," IP Transfer Point, Cisco IOS Release 12.2(4)MB12, pp. 31-50 (Publication Date Unknown).
"Configuring ITP Optional Features," IP Transfer Point, Cisco IOS Release 12.294)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
Notification of Transmittal of the International Search Report and The Written Opinion of the International Searching Authority, or the Declaration for International application No. PCT/US2009/036538 (Sep. 30, 2009).
Supplementary European Search Report for European application No. 04751843.6 (Aug. 7, 2009).
Communication pursuant to Article 94(3) EPC for European application No. 06844747.3 (Jul. 28, 2009).
Notice of Allowance and Fee(s) Due for U.S. Appl. No. 11/706,837 (May 27, 2010).
Communication Pursuant to Article 94(3) EPC for European Application No. 06844747.7 (May 11, 2010).
Notice of Allowance and Fee(s) Due for U.S. Appl. No. 11/879,737 (Apr. 22, 2010).
Interview Summary for U.S. Appl. No. 11/364,759 (Apr. 21, 2010).
Commonly-assigned, co-pending U.S. Appl. No. 12/732,178 for "Methods, Systems, and Computer Readable Media for Providing Home Subscriber Server (HSS) Proxy," (Unpublished, filed Mar. 25, 2010).
Supplemental European Search Report for European application No. 03734522.0 (Feb. 23, 2010).
Communication pursuant to Article 94(3) EPC for European application No. 07810606.9 (Feb. 12, 2010).
Final Official Action For U.S. Appl. No. 11/364,759 (Jan. 21, 2010).
"Diameter (Protocol)," Wikipedia, pp. 1-8 (Document last modified on Jan. 16, 2010).
Chinese Official Action for Chinese Patent Application No. 200780012095.7 (Jan. 8, 2010).
Final Official Action for U.S. Appl. No. 11/706,837 (Dec. 15, 2009).
Supplementary European Search Report for European application No. 07810606.9 (Nov. 23, 2009).
Supplementary European Search Report for European Patent No. 1676386 (Oc. 30, 2009).
Interview Summary for U.S. Appl. No. 11/706,837 (Oct. 26, 2009).
Non-Final Official Action for U.S. Appl. No. 11/879,737 (Sep. 30, 2009).
Official Action for U.S. Appl. No. 10/405,859 (Aug. 3, 2009).
Final Official Action for U.S. Appl. No. 11/879,737 (Jun. 9, 2009).
Official Action for U.S. Appl. No. 11/706,837 (May 13, 2009).
Official Action for U.S. Appl. No. 11/364,759 (Mar. 30, 2009).
Final Official Action for U.S. Appl. No. 10/405,859 (Jan. 6, 2009).
3GPP, "Digital Cellular Telecommunications System (Phase 2+); Universal Mobile Telecommunications System (UMTS); LTE; IP Multimedia (IM) Subsystem Cx and Dx Interfaces; Signalling Flows and Message Contents," ETSI TS 129 228 V8.4.0 (Jan. 2009).
Notification of Transmittal of the International Search Report and the Written Opinion of the International Searching Authority, or the Declaration for International Application No. PCT/US07/16370 (Sep. 15, 2008).
Official Action for U.S. Appl. No. 11/879,737 (Sep. 15, 2008).
Notification Concerning Transmittal of International Preliminary Report on Patentability for Internation Application No. PCT/US2007/002520 (Aug. 21, 2008).
Interview Summary for U.S. Appl. No. 10/405,859 (Aug. 20, 2008).
Official Action for U.S. Appl. No. 11/706,837 (Jul. 29, 2008).
Notification of Transmittal of the International Search Report and the Written Opinion of the International Searching Authority, or the Declaration for International Application No. PCT/US07/04175 (Jul. 22, 2008).
Official Action for U.S. Appl. No. 10/405,859 (Mar. 17, 2008).
Notification of Transmittal of the International Search Report and the Written Opinion of the International Searching Authority, or the Declaration for Internation Application No. PCT/US07/02520 (Mar. 3, 2008).
Restriction Requirement for U.S. Appl. No. 10/405,859 (Feb. 6, 2008).
Notification of Transmittal of the International Search Report and Writtent Opinion of the International Searching Authority, or the Declaration for International Application No. PCT/US07/13732 (Jan. 29, 2008).
Supplementary European Search Report for European application No. 04 756 094.1 (Mar. 29, 2007).
Camarillo et al., "The Session Initiation Protocol (SIP) P-User-Database Private-Header (P-Header)," Network Working Group, RFC 4457, pp. 1-8 (Apr. 2006).
Liu et al., "Introduction to Diameter," IBM, pp. 1-12 (Jan. 24, 2006).
International Search Report in PCT Application No. 03/32626 (Mar. 5, 2004).
Bertrand, "Jambala Mobility Gateway-Convergence and Inter-System Roaming," Ericsson Review, p. 89-93 (1999).
Official Action for U.S. Appl. No. 11/605,837 (Jul. 20, 2010).
Notice of Allowance and Fee(s) Due for U.S. Appl. No. 10/405,859 (Mar. 9, 2010).

* cited by examiner

METHODS, SYSTEMS, AND COMPUTER PROGRAM PRODUCTS FOR USING AN E.164 NUMBER (ENUM) DATABASE FOR MESSAGE SERVICE MESSAGE ROUTING RESOLUTION AMONG 2G AND SUBSEQUENT GENERATION NETWORK SYSTEMS

TECHNICAL FIELD

The subject matter described herein relates to providing E.164 number (ENUM) mapping service in a communications network. More particularly, the subject matter described herein relates to methods, systems, and computer program products for using an ENUM database for message service message routing resolution among 2G and subsequent generation network systems.

BACKGROUND

Cellular communications networks have evolved over time such that there are now a variety of network technologies available in the marketplace. As technology advances, newer systems are deployed. However, older legacy systems cannot be made immediately obsolete. Older legacy systems require maintenance for a variety of reasons. For example, the cost of upgrading equipment may be prohibitive. As well, an installed customer base may rely on installed equipment and resist expenditures for newer technology.

Two such presently deployed network technologies are second generation (2G) cellular systems and third generation (3G) cellular systems. 3G networks are the newer generation of the two and provide many existing 2G services as well as adding additional services. Examples of 2G networks include interim standard-41 (IS-41) and global system for mobile communications (GSM) networks. Examples of 3G networks include session initiation protocol (SIP)-based networks, Internet protocol (IP) multimedia subsystem (IMS) networks and cellular internet access networks.

One service that is available in both systems is short message service (SMS). Short message service (SMS), which was first introduced by European wireless network operators in 1991, enables mobile subscribers to easily send and receive text messages via wireless handsets. Although specifications and industry standards related to SMS are constantly evolving and being modified, SMS messages have traditionally been used to convey readable text information, where the text may include any combination of characters that may be entered via a keypad or keyboard. Multimedia message service (MMS) extends the basic SMS concept to include a variety of message content types, including text, still images, video, and audio.

SMS delivery service provides a mechanism for transmitting messages to and from SMS capable terminals (e.g., wireless handsets, personal computers, etc.) via a signaling component of the wireless communication network. With particular regard to the sending and receiving of SMS messages by a wireless handset, a signaling network provides the transport facilities necessary to communicate short messages between a store-and-forward network element, known as a short message service center (SMSC), and a wireless handset.

In contrast to earlier text message transmission services, such as alphanumeric paging, SMS technology is designed to provide guaranteed delivery of an SMS message to a destination. That is, if a temporary network failure or the unavailability of a message recipient prohibits the immediate delivery of an SMS message, then the SMS message is stored in the network (i.e., at an SMSC) until the destination/intended message recipient becomes available. Another of the key and distinguishing characteristics of SMS service, with respect to previously available message communication services, is that an active mobile handset is able to send or receive a short message at any time, regardless of whether or not a voice or data call is in progress.

Internet engineering task force (IETF) request for comments number 2916 (RFC 2916) describes an ENUM system for facilitating the interconnection of communications networks that rely on telephone numbers with the communications networks that utilize the domain name system (DNS). In particular, the ENUM system can map a particular number referred to as an E.164 number to one or more uniform resource identifiers (URIs) in the DNS. URIs are strings of characters that identify resources, such as documents, images, files, databases, e-mail addresses, websites or other resources or services in a common structured format. A URI can include among other things a SIP URI, an instant messaging (IM) identifier, an e-mail address identifier, an Internet chat session identifier, and an IP address.

To assist with the routing of SMS messages in a 3G network, the ENUM system may be used to find a delivery address of an SMS message recipient. However, improper provisioning of the ENUM database or the absence of a 3G delivery address for the SMS message may result in the SMS message being undeliverable even when the intended message recipient is reachable via a 2G network address. Accordingly, there exists a need for improved methods, systems, and computer program products for using an E.164 number (ENUM) database for message service message routing resolution among 2G and 3G network systems.

SUMMARY

According to one aspect, the subject matter described herein comprises methods, systems, and computer program products for messaging service message routing resolution among 2G and subsequent generation network systems. One method includes receiving a message service message including message service content and a 2G message recipient identifier associated with a messaging service message recipient. An ENUM database is queried using the 2G message recipient identifier. A response is received from the ENUM database. Based on the response, unavailability of a subsequent generation network address for the recipient is determined. In response to the unavailability, delivery of the message service content to the recipient is attempted via a 2G network.

As used herein, a subsequent generation network includes a third generation (3G) network, a fourth generation (4G) network, and any later generation network. Accordingly, all subsequent generation networks after 2G are considered within the scope of the subject matter described herein. The term "message service message" is intended to refer to a message that carries non-call media content between subscribers of 2G and subsequent generation networks. Examples of message service messages include SMS messages, MMS messages, and instant messages.

The subject matter described herein providing message service message routing resolution among 2G and 3G network systems may be implemented using a computer program product comprising computer executable instructions embodied in a computer readable medium. Exemplary computer readable media suitable for implementing the subject matter described herein include disk memory devices, programmable logic devices, application specific integrated circuits, and downloadable electrical signals. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
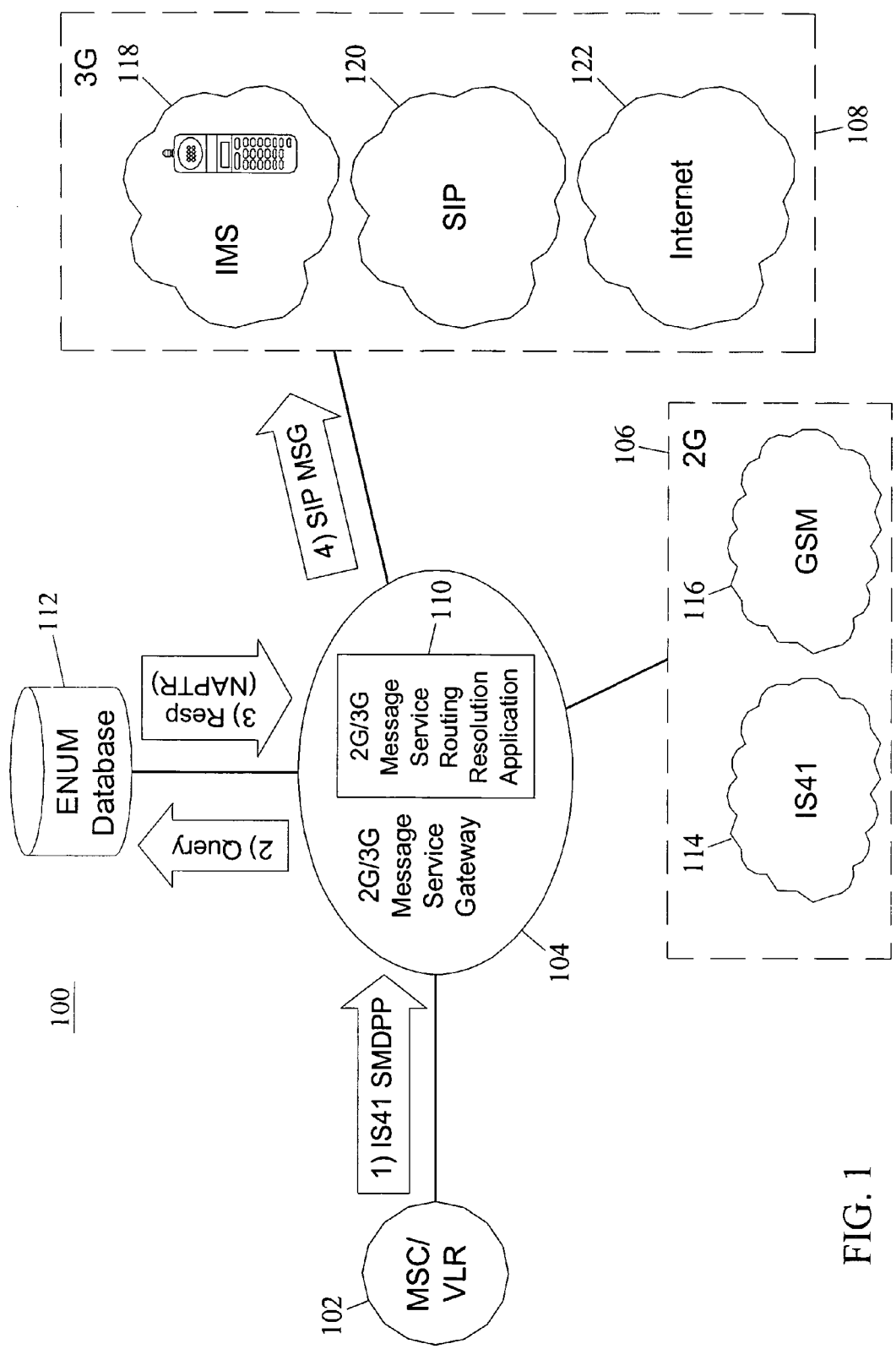
FIG. 1 is a block diagram of an exemplary communications network including functionality for using ENUM service to perform routing resolution for message service messages according to an embodiment of the subject matter described herein.

According to one aspect of the subject matter described herein, a method for message service message routing resolution among 2G and 3G networks is provided. FIG. 1 illustrates an exemplary communications network 100 including functionality for using ENUM service to perform routing resolution for message service messages according to an embodiment of the subject matter described herein. In FIG. 1, mobile switching center/visitor location register (MSC/VLR) 102 performs media stream switching and signaling functions for mobile telephone calls. MSC/VLR 102 may also perform location register functions for roaming subscribers. MSC/VLR 102 generates signaling messages for delivering message service messages originated by mobile subscribers. A 2G/3G message service gateway 104 performs routing resolution for delivering message service messages to 2G network 106 and 3G network 108. In one exemplary implementation, 2G/3G message service gateway 104 includes a 2G/3G message service routing resolution application 110 for communicating with an ENUM database 112 to perform the routing resolution.

2G/3G message service routing resolution application 110 may query ENUM database 112 to obtain the delivery address for a message service message received by 2G/3G message service gateway 104. If a 3G delivery address is provisioned for an intended recipient in ENUM database 112, 2G/3G message service routing resolution application 110 may insert that address in the message and attempt to deliver the message to 3G network 108. If, however, a 3G delivery address is not provisioned for the intended recipient in ENUM database 112, 2G/3G message service routing resolution application 110 may attempt to deliver the message based on a 2G delivery address contained in the message. Detailed message flow examples for both of these cases will be described below.

In the illustrated example, 2G network 106 includes IS-41 network 114 and GSM network 116. Similarly, 3G network 108 includes IMS network 118, SIP network 120, and Internet 122. It should be understood that the 2G and 3G network examples illustrated in FIG. 1 are shown for illustrative purposes only and that 2G network 106 and 3G network 108 may use different or additional protocols.

In the message flow example illustrated in FIG. 1, MSC 102 originates an IS-41 short message delivery point-to-point (SMDPP) message 122 and forwards the message to 2G/3G message service message gateway 104. Gateway 104 formulates a query 124 including a message recipient identifier and sends the query to ENUM database 112. The message recipient identifier may be a 2G message recipient identifier extracted or derived from the SMDPP message. For example, the message recipient identifier may be any one of a short code address, a mobile identification number, a mobile subscriber ISDN number, an E.164 number, a North American numbering plan (NANP) number, or an IP-based short message peer-to-peer (SMPP) address.

In one embodiment, gateway 104 may be adapted to re-format the message recipient identifier into an E.164 form for use with ENUM database 112. For instance, an E.212 formatted message recipient identifier may be re-formatted to an E.164 form prior to querying of the ENUM database 112. In this example, it is assumed that ENUM database 112 has a 3G delivery address corresponding to the message recipient identifier. Accordingly, ENUM database 112 performs a lookup based on the message recipient identifier and returns an NAPTR record including one or more 3G delivery addresses for the intended recipient. 2G/3G message service message gateway 104 receives the message including the NAPTR record for the subscriber and formulates a SIP message (e.g., SIP MESSAGE or SIP INFO message) for delivering the message service message to 3G network 108.

Figure 2:
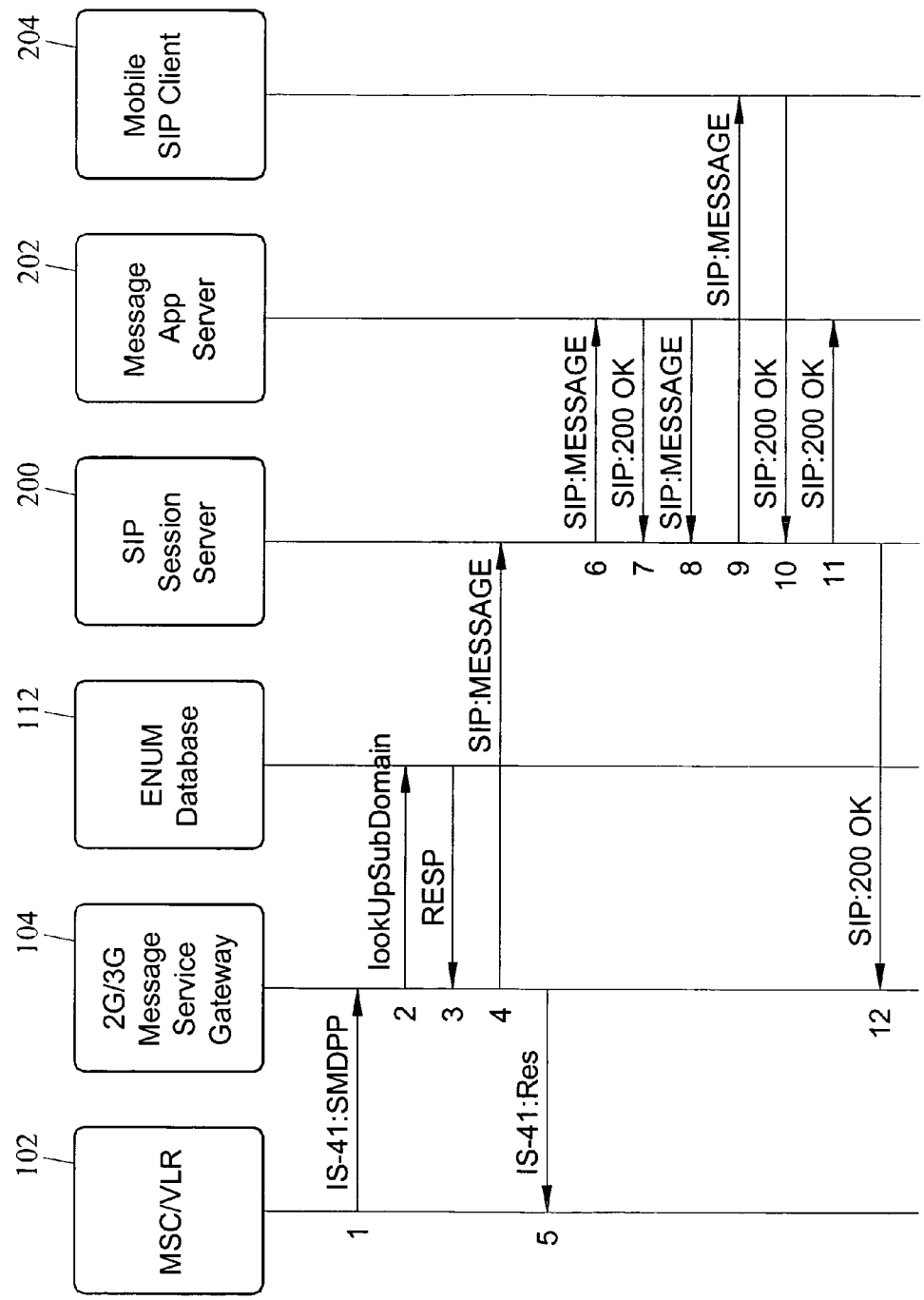
FIG. 2 is a message flow diagram illustrating exemplary messages exchanged in delivering a message service message to a 3G delivery address according to an embodiment of the subject matter described herein.

FIG. 2 is a message flow diagram illustrating in more detail exemplary messages associated with delivering a message service message to a 3G delivery address using an ENUM database according to an embodiment of the subject matter described herein. Referring to FIG. 2, in line 1 of the message flow diagram, MSC/VLR 102 formulates an IS-41 SMDPP message and sends the SMDPP message to gateway 104. In line 2 of the message flow diagram, gateway 104 formulates a lookup subdomain message including a recipient identifier and forwards the lookup subdomain message to ENUM database 112. In line 3 of the message flow diagram, ENUM database returns a response to gateway 104 including the 3G delivery address for the intended recipient.

In line 4 of the message flow diagram, 2G/3G message service message gateway formulates a SIP MESSAGE message including the message service message content and forwards the message to a SIP session server 200. In line 5 of the message flow diagram, 2G/3G message service message gateway 104 sends an IS-41 response message indicating that the SMDPP message in line 1 has been delivered to the 3G network.

In line 6 of the message flow diagram, SIP session server 200 formulates a SIP MESSAGE message and sends the message to message application server 202. In line 7 of the message flow diagram, message application server 202 formulates a 200 OK message and sends the message to SIP session server 200. It should be noted that message application server 202 may perform operations on the SIP message and may modify the SIP message prior to delivery. Accordingly, in line 8 of the message flow diagram, message application server 202 formulates a SIP MESSAGE message and sends the message to SIP session server 200. In line of the message flow diagram, SIP session server 200 formulates a SIP MESSAGE message including the message service message content and forwards the message to mobile SIP client 204. In line 10 of the message flow diagram, mobile SIP client 204 sends a 200 OK message to SIP session server 200. In line 11 of the message flow diagram, SIP session server 200 sends a 200 OK message to message application server 202. In line 12 of the message flow diagram, SIP session server 200 sends a 200 OK message to message service message gateway 104 concluding the message delivery transaction.

Figure 3:
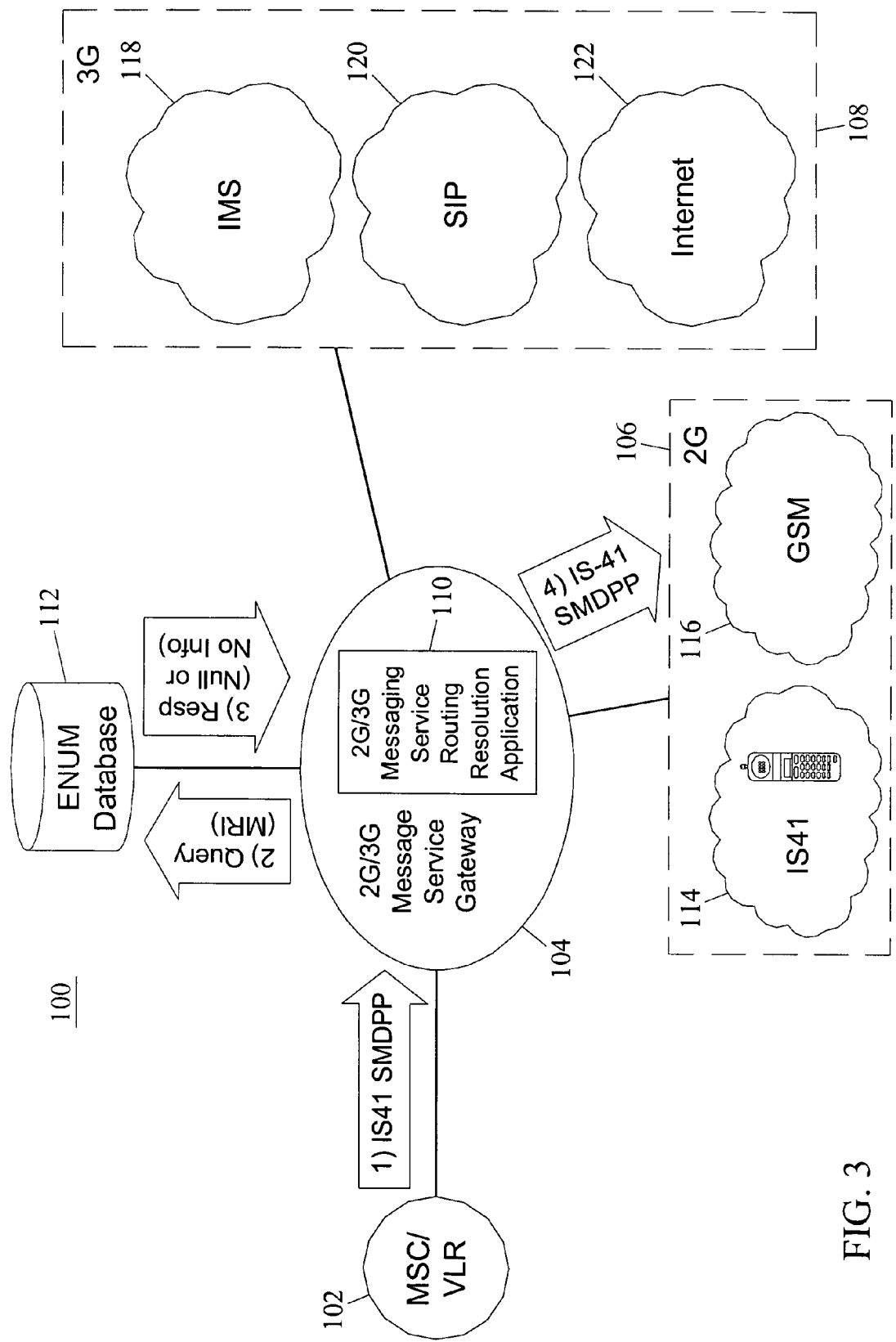
FIG. 3 is a block diagram of an exemplary communications network illustrating delivery of a message service message to a 2G delivery address for a subscriber when an ENUM database lacks a 3G delivery address for the subscriber according to an embodiment of the subject matter described herein.

FIG. 3 is a network diagram of network 100 illustrated in FIG. 1 illustrating the case where ENUM database 112 does not include a 3G delivery address for a subscriber. Referring to FIG. 3, MSC/VLR 102 formulates an IS-41 SMDPP message and sends the message to 2G/3G message service message gateway 104. 2G/3G message service message gateway 104 queries ENUM database 112 for a 3G delivery address for the subscriber. In this case, ENUM database 112 does not include a 3G delivery address for the subscriber. Accordingly, ENUM database 112 responds indicating that a 3G delivery address is not provisioned for the intended recipient.

In response to receiving the message indicating that a 3G address is not provisioned for the subscriber, 2G/3G message service message gateway 104 attempts to deliver the message via 2G network 106. In the illustrated example, 2G/3G message service message gateway may extract a 2G message service message delivery address from the message and deliver the message to the appropriate 2G network. In this example, the subscriber is located in GSM network 116. Accordingly, 2G/3G message service message gateway sends a GSM forward short message message to GSM network 116.

Figure 4:
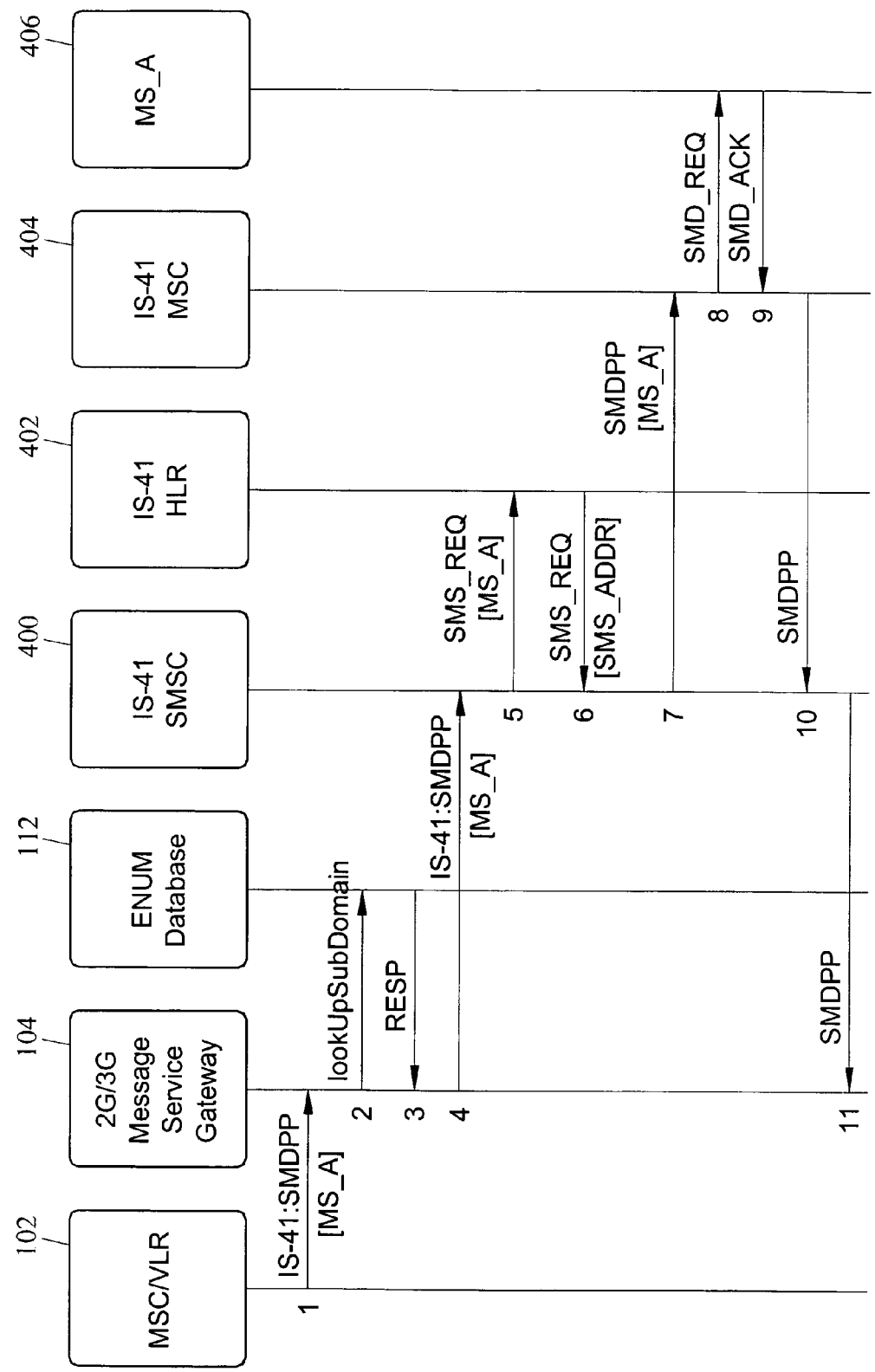
FIG. 4 is a message flow diagram illustrating exemplary messages exchanged in delivering a message service message to a 2G delivery address for a subscriber when an ENUM database lacks an entry for the subscriber according to an embodiment of the subject matter described herein.

FIG. 4 is a message flow diagram illustrating in more detail exemplary messages exchanged between the entities associated with the 2G delivery example illustrated in FIG. 3. Referring to FIG. 4, in line 1, MSC/VLR 102 formulates an IS-41 SMDPP message and sends the message to 2G/3G message service gateway 104. In line 2 of the message flow diagram, 2G/3G message service gateway 104 sends a lookup subdomain message to ENUM database 112. In line 3 of the message flow diagram, ENUM database 112 responds with a message indicating that a 3G delivery address was not provisioned for the destination mobile subscriber.

Accordingly, in 2G/3G MS gateway 104 may attempt to deliver the message via the 2G network. In line 4 of the message flow diagram, 2G/3G MS gateway formulates and sends an IS-41 SMDPP message to the short message service center associated with the destination mobile subscriber. In this example, the destination mobile subscriber is referred to as mobile station A or MS_A. The address of the message center serving the mobile subscriber may be determined by performing a global title translation on the SMS destination address stored in the MAP portion of the SMDPP message. In line 5 of the message flow diagram, IS-41 SMSC 400 sends an SMS request message to IS-41 HLR 402 to determine the system that is currently serving mobile station A. In line 6 of the message flow diagram, IS-41 HLR 402 responds with the SMS address of the serving MSC. In line 7 of the message flow diagram, IS-41 SMSC 400 sends an SMDPP message including the short message content to IS-41 MSC 404.

In lines 8 and 9 of the message flow diagram, IS-41 MSC 404 delivers the message service message to mobile station A 406 and receives acknowledgement from mobile station A 406. In lines 10 and 11 of the message flow diagram, acknowledgement of delivery of the message service message is communicated to IS-41 SMSC 400 and 2G/3G message service gateway 104.

Although the examples in FIGS. 3 and 4 relate to using the ENUM database and attempting to deliver a message service message to an IS-41 subscriber, the subject matter described herein is not limited to delivering messages to IS-41 2G subscribers. In an alternate implementation, 2G/3G message service gateway 104 may deliver messages to 2G GSM subscribers using ENUM database 112. For example, referring back to FIG. 3, the SMDPP message received by 2G/3G message service message gateway 104 may be a GSM forward short message message. Similarly, once 2G/3G message service gateway determines that a 3G network address is not provisioned for the subscriber, 2G/3G message service message gateway 104 may formulate a GSM forward short message message and forward the message to the SMSC or other entity in GSM network 116 for delivery to a GSM subscriber.

In yet another alternate implementation, 2G/3G message service gateway 104 may store information for subscribers with dual mode handsets capable of operating in IS-41 and GSM networks. In such an implementation, 2G/3G message service message gateway may store information indicating the type of network in which the subscriber is currently registered and use that information to formulate the appropriate message to IS-41 network 114 or GSM network 116. Detailed examples of methodology suitable for deriving IS-41 or GSM registration information and storing that information in a signaling message routing node is described in commonly-assigned, co-pending U.S. Patent Application Publication No. US2004/0219935 A1, the disclosure of which is incorporated herein by reference in its entirety.

Figure 5:
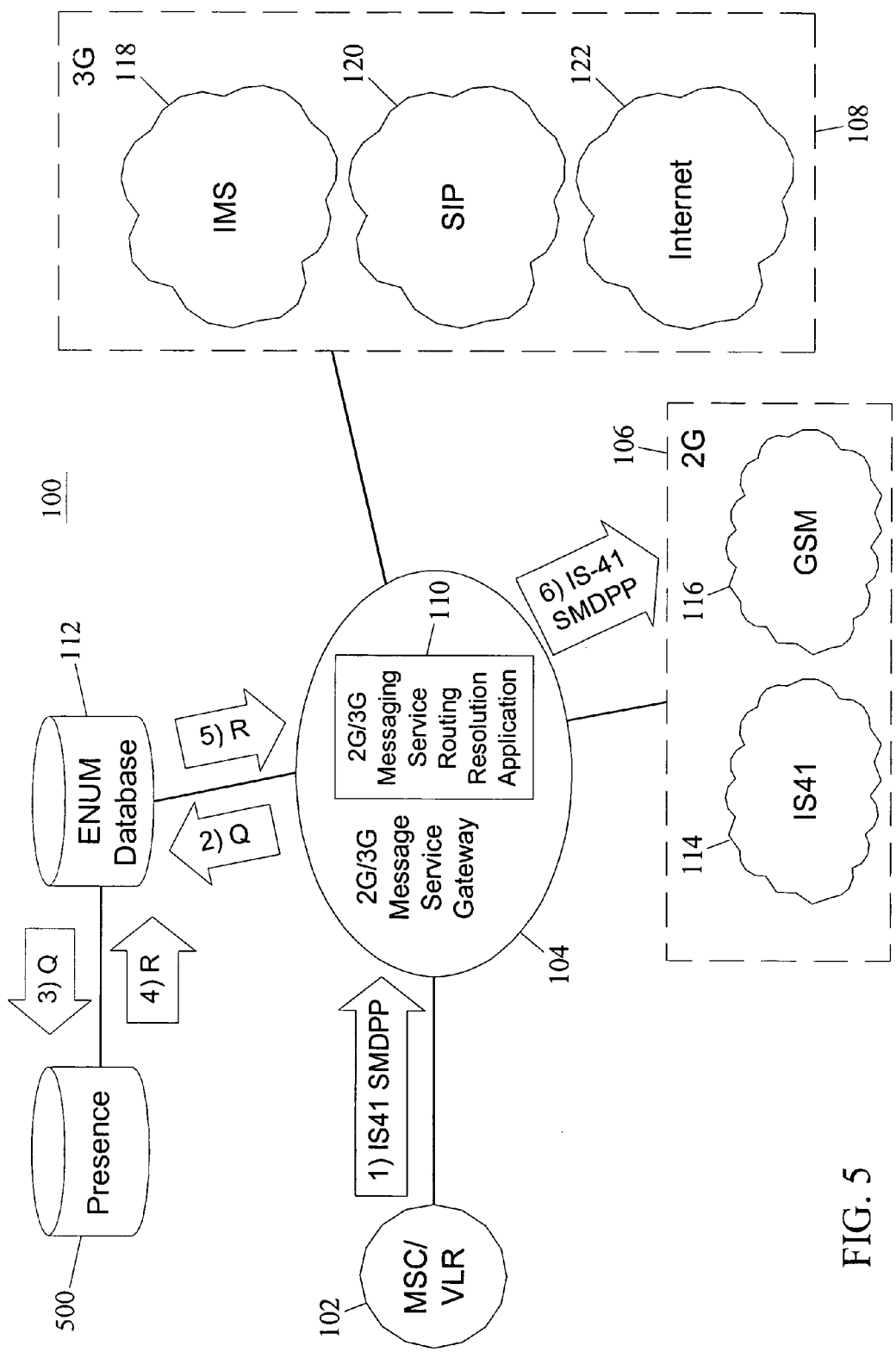
FIG. 5 is a block diagram of an exemplary communications network illustrating an example where an ENUM database queries a presence database to select an available delivery address according to an embodiment of the subject matter described herein.

The subject matter described herein is not limited to attempting to deliver a message to a 2G subscriber in response to determining that a record for the subscriber is not provisioned in ENUM database 112. For example, a message service gateway according to an embodiment of the subject matter described herein may also attempt to deliver a message to a subscriber via the 2G network when ENUM database 112 determines that the subscriber is not available via any of the subscribers provisioned 3G delivery addresses based on presence information. FIG. 5 illustrates this scenario. In FIG. 5, MSC/VLR 102 sends an IS-41 SMDPP message to 2G/3G message service message gateway 104. In response, 2G/3G message service message gateway 104 queries ENUM database 112 for a 3G delivery address for the subscriber. ENUM database 112 queries presence database 500 to determine whether the subscriber is reachable via any of the 3G addresses located in its internal database lookup. In step 4, it is assumed that presence database 500 returns a response indicating that the subscriber is not available at any of the 3G addresses. Accordingly, in step 5, ENUM database responds to 2G/3G message service gateway 104 indicating that all of the 3G network delivery addresses are unavailable or with a null record that does not indicate any 3G delivery addresses. In step 6, 2G/3G message service gateway 104 attempts to deliver the message to the subscriber via 2G network 106. The detailed message flow for such delivery may be similar to that illustrated in FIG. 4.

The subject matter described herein is not limited to having the ENUM database query the presence database. In an alternate implementation, gateway 104 may query an internal or external presence database to determine the 3G address availability.

Figure 6:
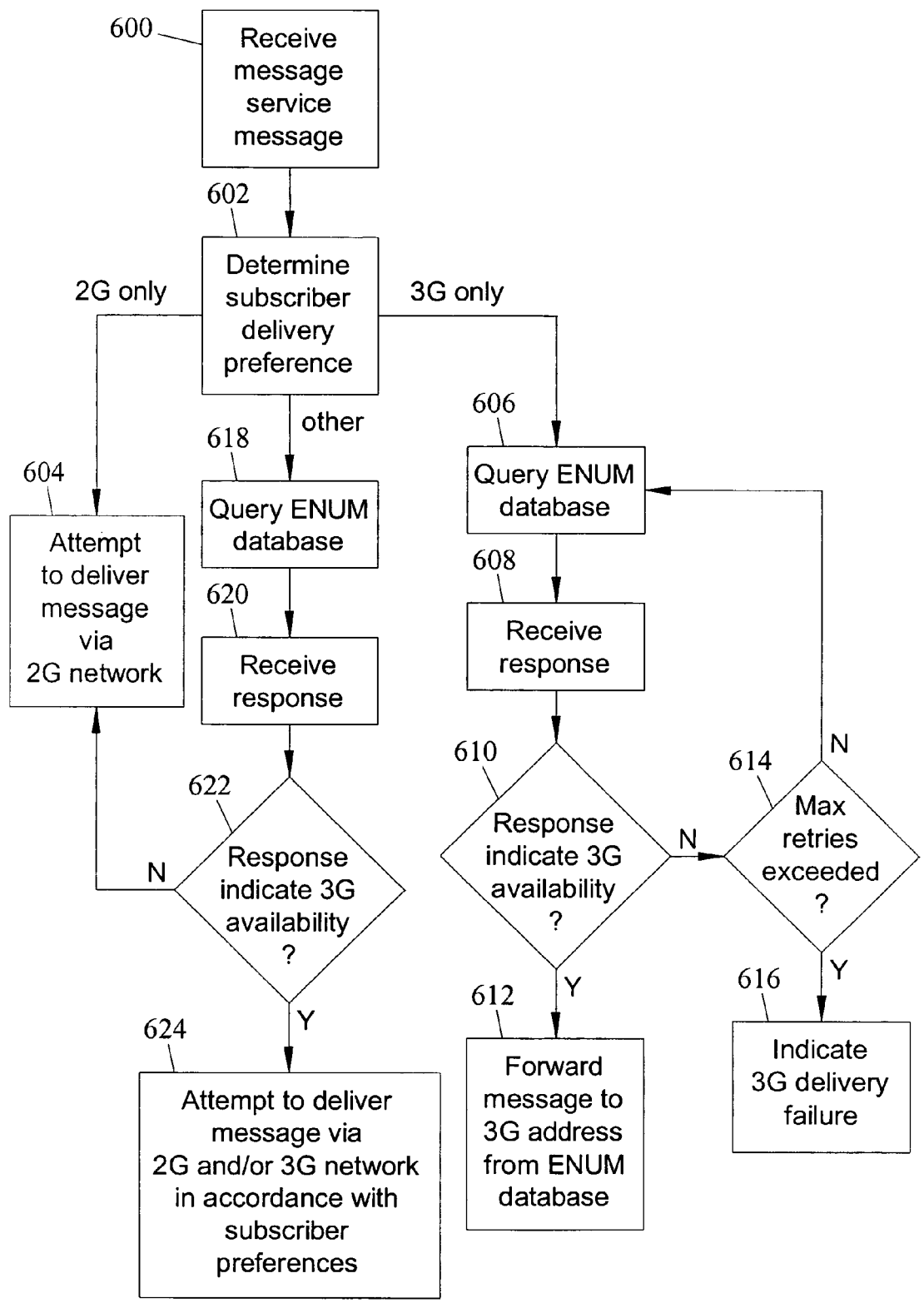
FIG. 6 is a flow chart illustrating exemplary steps in delivering a message service message to a 2G or a 3G network based on a subscriber delivery preference according to an embodiment of the subject matter described herein.

In yet another enhancement of the subject matter described herein, 2G/3G message service message gateway may store preference data indicative of whether a subscriber desires to have messages delivered via 3G network 108, 2G network 106, or both. FIG. 6 is a flow chart illustrating exemplary steps that may be performed by 2G/3G message service gateway 104 in using subscriber preference information and/or ENUM information in determining whether to deliver a message to a subscriber via 2G network 106 or 3G network 108 according to an embodiment of the subject matter described herein. Referring to FIG. 6, in step 600, gateway 104 receives a message service message. In step 602, gateway 104 may determine the destination subscriber delivery preference. If the destination subscriber delivery preference is 2G only, control proceeds to step 604 where gateway 104 attempts to deliver the message via 2G network 106 without querying the ENUM database.

Returning to step 602, if the subscriber's delivery preference is determined to be 3G only, control proceeds to step 606 where gateway 104 queries ENUM database 112. In step 608, gateway 104 receives a response from ENUM database 112. In step 610, it is determined whether the response indicates an available 3G delivery address. If the response indicates an available 3G delivery address, control proceeds to step 612 where the message is forwarded to the 3G delivery address returned by ENUM database 112. In step 610, if the response does not indicate an available 3G delivery address, the ENUM database may be queried a predetermined number of times until an available delivery address is provisioned or an address that is currently unavailable becomes available. Accordingly, in step 614, it is determined whether the maximum number of retries has been exceeded. If the maximum number of retries has not been exceeded, steps 606-610 are repeated until the message can be delivered. If the maximum number of retries is exceeded, control proceeds to step 616 where a 3G delivery failure is indicated.

Returning to step 602, if it is determined that the subscriber delivery preference is other than 2G only or 3G only, control proceeds to step 618 where ENUM database 112 is queried. In step 620, a response is received. In step 622, it is determined whether the response indicates an available 3G delivery address. If the response does not indicate an available 3G delivery address, control returns to step 604 where the message is attempted to be delivered via the 2G network. If the message contains an available 3G delivery address, control proceeds to step 624 where the message is attempted to be delivered via the 2G and/or the 3G network in accordance with subscriber preferences. For example, if 2G and 3G delivery addresses are available, the subscriber may prefer 3G delivery addresses, and the message may be delivered via the 3G network. In another example, a subscriber may prefer 2G addresses over 3G addresses and delivery may be attempted via the 2G network. In yet another example, a subscriber may prefer to receive messages via both the 2G and 3G networks for maximum reliability.

Figure 7:
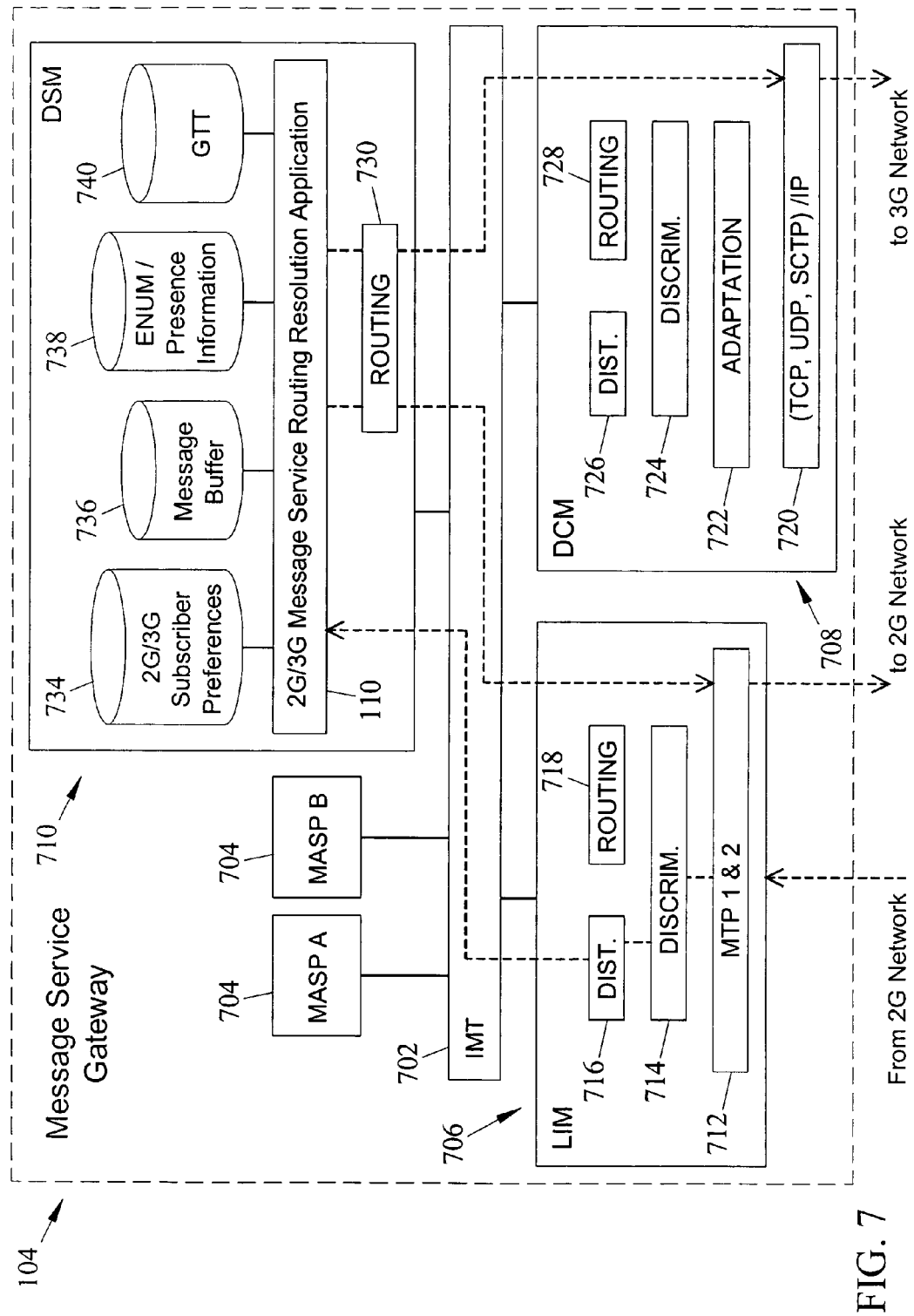
FIG. 7 is a block diagram of a message service gateway for a recipient for providing 2G/3G message service message routing resolution according to an embodiment of the subject matter described herein.

FIG. 7 is a block diagram illustrating an exemplary internal architecture of 2G/3G message service gateway 104 according to an embodiment of the subject matter described herein. In FIG. 7, gateway 104 includes a high speed inter-processor message transport (IMT) communications bus 702. A number of distributed processing modules or cards may be coupled to IMT bus 702. In FIG. 7, these processing modules or cards include a pair of maintenance and administration subsystem processors (MASP) 704, a signaling system 7 (SS7) link interface module (LIM) 706, a IP-capable DCM 708, and a 2G/3G database services module (DSM) 710. These modules may be physically connected to the IMT bus 702 such that signaling and other types of messages may be routed internally between active cards or modules. The distributed, multi-processor architecture of 2G/3G SMG 104 may facilitate the deployment of multiple LIM, DCM, DSM and other cards, all of which may be simultaneously connected to and communicating via IMT bus 702.

MASP pair 704 implements a maintenance and administration subsystem function that is not particularly relevant to a discussion of the 2G/3G message service message routing of the present disclosure. Accordingly, a detailed discussion of their function is not provided herein.

LIM 706 interfaces with one or more external signaling links. LIM 706 may have a number of sub-components. In FIG. 7, these sub-components include an SS7 MTP level 1 & 2 function 712, an SS7 MTP level 3 layer message discrimination function 714, message distribution function 716, and a routing function 718. MTP level 1 and 2 function 712 provides facilities to send and receive digital data over a particular physical medium, as well as to provide error detection, error correction and sequenced delivery of SS7 messages.

MTP level 3 discrimination function 714 may receive signaling messages from the lower processing layers and perform discrimination operations, which may include determining whether a received message (e.g., an SS7 message) is to be allowed into gateway 104 and determining whether the received message packet requires processing by an internal processing subsystem or is simply to be through switched (i.e., routed on to another node in the network). Examples of received SS7 messages that may require internal processing include signaling connection control part messages in need of global title translation (GTT) and signaling network management messages. By providing this discrimination functionality, discrimination function 714 may effectively provide 2G/3G message service gateway 104 with a network firewall. Discrimination function 714 may examine received message parameters, including message transfer part (MTP) routing label parameters, signaling connection control part (SCCP) layer parameters, transaction capabilities application part (TCAP) layer parameters, and mobile application part (MAP) layer parameters. Exemplary discrimination parameters include origination point code (OPC)/destination point code (DPC) parameters, a service indicator (SI) parameter, SCCP called and calling party address parameters, an SCCP subsystem (SSN) parameter, a translation type (TT) parameter, a MAP operation code (OpCode) parameter, and others. Discrimination based on these parameters enables function 714 to determine whether internal processing is required.

For signaling connection control part (SCCP) messages that require GTT or other processing by 2G/3G DSM 710, message distribution function 716 may receive such messages from discrimination function 714 and direct the messages to 2G/3G DSM 710 via IMT bus 702.

For messages that contain message service message content, discrimination function 714 may identify such messages and forward these messages to distribution function 716. Distribution function 716 may distribute such messages to one of a plurality of identically provisioned DSM modules 710. This type of internal distribution of messages within 2G/3G message service message gateway 104 should not be confused with message routing, which refers to selecting an external signaling link over which a received message may be forwarded.

Routing function 718 is responsible for examining an incoming message and determining on which outbound linkset and link the message is to be transmitted. Unlike conventional MTP routing functions that select routes based only in DPC and route cost, routing function 718 may utilize origination or source entity information associated with non-adjacent nodes (e.g., an OPC value, a source IP address, a calling party dialed number, etc.) during route selection process. As such, messages addressed to the same destination point code but sent from different origins may be forwarded over different routes to the same destination independently of the intermediate network between the signaling message origin and 2G/3G message service gateway 104. Once route selection is made, routing function 718 may ensure that the message is directed internally to the appropriate communication module (e.g., SS7 LIM, DCM, 2G/3G DSM, etc.) for outbound transmission.

DCM 708 includes an IP transport function 720, a signaling protocol adaptation/translation function 722, a discrimination function 724, a distribution function 726, and a routing function 728. IP transport function 720 includes hardware and software for implementing OSI layers 1-3. For example, IP transport function may implement a physical layer protocol, such as Ethernet, a network layer protocol, such as IP, and a transport layer protocol, such as transmission control protocol (TCP), user datagram protocol (UDP), and/or stream control transmission protocol (SCTP). According to one exemplary embodiment of the subject matter disclosed herein, adaptation and translation function 722 may receive a signaling message from an IP network that is formatted according to a first signaling protocol (e.g., M3UA), and adapt or reformat the message into a second signaling protocol (e.g., MTP). It will be appreciated by those skilled in the art that M3UA is considered to be a protocol for adapting native SS7 signaling messages for transport via an IP communication link. According to another exemplary mode of operation, adaptation and translation function 722 may receive a signaling message, such as a SIP message, and translate the SIP message into an equivalent SS7 or SS7-adaptation protocol message, and vice-versa. These adaptation and translation processing operations may be performed on in-bound and out-bound signaling messages. In yet another embodiment of the subject matter disclosed herein, an adaptation and translation function similar to function 722 may be located on LIM and high speed link (HSL) communication modules, thereby enabling signaling message adaptation and translation operations to be performed on some or all LIM and HSL interfaces in an SMG routing node.

Discrimination function 724 performs discrimination operations similar to those described above with respect to discrimination function 714, and as such discrimination function 724 may provide 2G/3G message service gateway 104 with a network firewall. In addition to the SS7 and SS7-adaptation protocol discrimination parameters described above, discrimination function 724 may also examine received SIP message parameters including a To parameter, a From parameter, a Via parameter, a source IP address parameter, a destination IP address parameter, and others. Discrimination based on these parameters enables function 724 to determine whether screening or internal processing is required. According to one embodiment, discrimination function 724 may copy a received signaling message, such that the original message may be routed to the target destination and the message copy may be processed by one or more processing subsystems associated with the SMG.

Distribution function 726 handles the internal routing of message packets that require additional processing prior to final routing. Such messages may include signaling messages associated with message service messages such as SMS, MMS, and IM services (e.g., SIP INFO message, SIP MESSAGE message, SIP INVITE message, etc.), as well as mobility management messages. Routing function 728 is adapted to access network routing rule information, which may include SS7 and IP network routing rules, and apply these routing rules to messages that require routing.

DSM 710 may include 2G/3G message service routing resolution application 110 described above. In addition, DSM 710 may include one or more databases 734, 736, and 738 for processing message service messages. In the illustrated example, database 734 stores subscriber preferences indicating whether a subscriber prefers 2G or 3G delivery. Database 736 is a message buffer for buffering message service messages or parameters for messages while ENUM and/or presence database is being queried. Database 738 stores ENUM and/or presence information. For example, ENUM database 112 may reside entirely within gateway 104. In such an implementation, database 738 may perform the functions of ENUM database 112 described above. Similarly, presence information may be stored on DSM 710. In such an implementation, database 738 may include presence information for global communications subscribers. In yet another alternate implementation, database 738 may cache ENUM and/or presence information received from responses to external queries to presence and/or ENUM databases.

In the example illustrated in FIG. 7, the dashed line arrow labeled "FROM 2G NETWORK" on LIM 610 represents a message service message that is received from an external network. The message may be forwarded by discrimination function to distribution function 716. Distribution function 716 may forward the message via IMT bus 702 to 2G/3G messaging service routing resolution application 110. 2G/3G messaging service message application 110 may query an internal or external ENUM database and attempt to deliver the message via 2G network or 3G network, depending on subscriber preferences and address availability. The dash line from application 110 through DCM 708 represents delivery of a message to the 3G network. Similarly, the dashed line from application 710 through LIM 706 indicates delivery of the message via the 2G network.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for messaging service message routing resolution among second generation (2G) and subsequent generation network systems, the method comprising:

receiving a message including message service message content and a 2G message recipient identifier;

querying an E.164 number (ENUM) database using the 2G message recipient identifier; and receiving a response from the ENUM database, wherein the response includes an indicator indicating availability of a recipient at one or more network delivery addresses;

determining, based on the response, unavailability of the recipient at the subsequent generation network delivery address provisioned for the recipient in the ENUM database or unavailability of the recipient via any subsequent generation network delivery addresses provisioned for the recipient in the ENUM database; and in response to determining the unavailability of a subsequent generation network delivery address provisioned for the recipient in the ENUM database or the unavailability of the recipient any subsequent generation network delivery addresses provisioned for the recipient in the ENUM database, attempting to deliver the message service content to the recipient via a 2G network.

2. The method of claim 1 wherein receiving a message includes receiving a short message service (SMS) message.

3. The method of claim 1 wherein receiving a message includes receiving a multimedia message service (MMS) message.

4. The method of claim 1 wherein the 2G message recipient identifier includes an identifier selected from a group including short code address, a mobile identification number, a mobile subscriber ISDN number, an E.164 number, a North American numbering plan (NANP) number, and an IP-based short message peer-to-peer (SMPP) address.

5. The method of claim 1 wherein receiving a response from the ENUM database includes receiving a response including a null value for a 3G network address.

6. The method of claim 1 wherein receiving a response from the ENUM database includes receiving a response including a 3G network address wherein the indicator indicates that the recipient is currently unavailable at the 3G network address.

7. The method of claim 1 wherein attempting to deliver the message service message content to the recipient via the 2G network includes translating a short message service center entity address in a mobile application part (MAP) portion of the message to a point code corresponding to a short message service center serving the recipient, formulating a message service message delivery message including the message service message content, and forwarding the message service message delivery message to the short message service center.

8. The method of claim 1 wherein attempting to deliver the message service message content to the recipient via the 2G network includes formulating an IS-41 message service message delivery message including the message service message content and forwarding the IS-41 message service message delivery message to an IS-41 network.

9. The method of claim 1 wherein attempting to deliver the message service message content to the recipient via the 2G network includes formulating a GSM message service message delivery message including the message service message content and forwarding the GSM message service message delivery message to the GSM network.

10. The method of claim 1 wherein determining, based on the response, unavailability of a subsequent generation network delivery address for the recipient includes querying a presence database using a 3G address returned by the ENUM database.

11. A method for message service message routing resolution among second generation (2G) and subsequent generation network systems, the method comprising:

receiving a message including message service content and a 2G message recipient identifier;

determining whether subscriber preference information regarding delivery of the message via a 2G network or a subsequent generation network exists;

querying an ENUM database, wherein a response to the query includes an indicator indicating availability of a subscriber at one or more network delivery addresses, and determining that both 2G and subsequent generation network delivery addresses are available for the subscriber, determining that both 2G and subsequent generation network delivery addresses are available for the subscriber includes determining that the subsequent generation network address is provisioned in the ENUM database and that the recipient is currently available at the 2G and subsequent generation network delivery addresses; and in response to determining that the subscriber preference information exists, delivering the message service content to a recipient via at least one of the 2G and the subsequent generation network in accordance with the subscriber preference information, wherein delivering the message service content in accordance with the subscriber preference information includes delivering the subscriber content via the 2G network if the subscriber preference information indicates that the subscriber prefers 2G delivery over 3G delivery.

12. A system for messaging service message routing resolution among second generation (2G) and subsequent generation network systems, the system comprising:

an E.164 Number (ENUM) database for storing information for translating 2G subscriber identifiers to 3G addresses, wherein the ENUM database is configured to respond to queries with a response including an indicator indicating availability of a subscriber at one or more network delivery addresses; and a 2G and subsequent generation message service gateway operatively associated with the ENUM database for receiving message including message service content and a 2G recipient identifier, for querying the ENUM database using the 2G recipient identifier, for receiving a response from the ENUM database, for determining, based on the response, unavailability of a subsequent generation network delivery address for the recipient or unavailability of the recipient via any subsequent generation network delivery address provisioned for the recipient with the ENUM database, and for attempting, in response to determining the unavailability of a subsequent generation network delivery address for the recipient in the ENUM database or the unavailability of the recipient via any subsequent generation network delivery addresses provisioned for the recipient in the ENUM database, attempting to deliver delivering the message service content to the recipient via a 2G network.

13. The system of claim 12 wherein the message comprises a short message service (SMS) message.

14. The system of claim 12 wherein the message comprises a multimedia message service message.

15. The system of claim 12 wherein the message recipient identifier includes an identifier selected from a group including a short code address, a mobile identification number, a mobile subscriber ISDN number, an E.164 number, a North American numbering plan (NANP) number, and an IP-based short message peer-to-peer (SMPP) address.

16. The system of claim 12 wherein the 2G and subsequent generation message service gateway is adapted to attempt to deliver the message service content via an IS-41 network.

17. The system of claim 12 wherein the 2G and subsequent generation message service gateway is adapted to attempt to deliver the message service content via a GSM network.

18. The system of claim 12 wherein the ENUM database is adapted to query a presence database to determine availability of a 3G address corresponding to the recipient.

19. The system of claim 12 wherein the 2G and subsequent message service message gateway is adapted to query a presence database to determine availability of a 3G address corresponding to the recipient.

20. A 2G and subsequent generation message service gateway comprising:
- at least one communications module for receiving a message including message service message content and a message recipient identifier; and
- a second 2G and subsequent generation message service routing resolution application for receiving the message, for querying an E.164 numbering (ENUM) database using the message recipient identifier, wherein the ENUM database replies to the query with a response including an indicator indicating availability of a recipient at one or more network delivery addresses, for receiving a response and determining, based on the response, unavailability of the recipient at a subsequent generation network delivery address provisioned in the ENUM database for the recipient or unavailability of the recipient via any subsequent generation delivery addresses provisioned for the recipient in the ENUM database, and for, in response to determining the unavailability of a subsequent generation network delivery addresses provisioned in the ENUM database for the recipient or the unavailability of the recipient via any subsequent generation delivery addresses provisioned for the recipient in the ENUM database, attempting to deliver the message service content to the recipient via a 2G network.

21. The second generation/subsequent generation message service gateway of claim 20 wherein the at least one communications module includes an SS7 communications module for sending and receiving SS7 messages including message service content.

22. The second generation/subsequent generation message service gateway of claim 20 wherein the at least one communications module includes an Internet protocol (IP) communications module for sending and receiving IP messages including message service content.

23. The second generation/subsequent generation message service gateway of claim 20 wherein the second generation/subsequent generation message service routing resolution application is adapted to attempt to deliver the message service content to the recipient via an IS-41 network.

24. The second generation/subsequent generation message service gateway of claim 20 wherein the second generation/subsequent generation message service routing resolution application is adapted to attempt to deliver the message service content to the recipient via a GSM network.

25. The second generation/subsequent generation message service gateway of claim 20 wherein the second generation/subsequent generation message service message routing resolution application is adapted to translate the recipient identifier into a 2G node address.

26. The second generation/subsequent generation message service gateway of claim 20 wherein the second generation/subsequent generation message service message routing resolution application is adapted to query a presence database to determine unavailability of a 3G address for the recipient.

27. The second generation/subsequent generation message service gateway of claim 20 wherein the second generation/subsequent generation message routing resolution application is adapted to access stored preference information for the recipient and to attempt to deliver the message service content to the recipient in accordance with the stored preference information.

28. A non-transitory computer program product comprising computer-executable instructions embodied in a computer-readable medium for performing steps comprising:
- receiving a message including message service message content and a 2G message recipient identifier;
- querying an E.164 number (ENUM) database using the 2G message recipient identifier;
- receiving a response from the ENUM database, wherein the response includes an indicator indicating availability of the recipient at one or more network delivery addresses;
- determining, based on the response, unavailability of the recipient at a subsequent generation network delivery address provisioned for the recipient in the ENUM database or unavailability of the recipient via any subsequent generation network delivery addresses provisioned for the recipient in the ENUM database; and
- in response to determining the unavailability of a subsequent generation network delivery address provisioned for the recipient in the ENUM database or the unavailability of the recipient any subsequent generation network delivery addresses provisioned for the recipient in the ENUM database, attempting to deliver the message service content to the recipient via a 2G network.

29. A non-transitory computer program product comprising computer-executable instructions embodied in a computer-readable medium for performing steps comprising:
- receiving a message including message service content and a 2G message recipient identifier;
- determining whether subscriber preference information regarding delivery of the message via a 2G network or a subsequent generation network exists;
- querying an ENUM database, wherein a response to the query includes an indicator indicating the availability of a subscriber one or more network delivery addresses, and determining that both 2G and subsequent generation network delivery addresses are available for the subscriber, determining that both 2G and subsequent generation network delivery addresses are available for the subscriber includes determining that the subsequent generation network address is provisioned in the ENUM database and that the recipient is currently available at the 2G and subsequent generation network delivery addresses; and
- in response to determining that the subscriber preference information exists, delivering the message service content to a recipient via at least one of the 2G and the subsequent generation network in accordance with the subscriber preference information, wherein delivering the message service content in accordance with the subscriber preference information includes delivering the subscriber content via the 2G network if the subscriber preference information indicates that the subscriber prefers 2G delivery over 3G delivery.

* * * * *